United States Patent

Menzi

[15] 3,679,013
[45] July 25, 1972

[54] WEIGHING APPARATUS WITH DAMPING MEANS

[72] Inventor: Hans Menzi, Staefa, Switzerland
[73] Assignee: Mettler Instrumente AG, Zurich, Switzerland
[22] Filed: March 30, 1971
[21] Appl. No.: 129,339

[30] Foreign Application Priority Data

May 12, 1970  Switzerland ........................ 7014/70

[52] U.S. Cl. .............................................. 177/184, 177/263
[51] Int. Cl. .................................................... G01g 21/10
[58] Field of Search ............... 177/184, 187, 188, 189, 263

[56] References Cited

UNITED STATES PATENTS 3,263,760  8/1966  Waller ........................... 177/184 X
1,096,096  5/1914  Burkholder ..................... 177/188 X

FOREIGN PATENTS OR APPLICATIONS 936,359  11/1955  Germany ........................ 177/189
11,524  8/1915  Great Britain .................. 177/188
1,030,870  5/1966  Great Britain .................. 177/184

Primary Examiner—Richard B. Wilkinson
Assistant Examiner—George H. Miller, Jr.
Attorney—Lawrence E. Laubscher

[57] ABSTRACT

Damping means for weighing apparatus of the type including an axially reciprocable suspension member for suspending a weighing pan from a balance beam, characterized in that the damping means is arranged to produce a damping effect on the suspension member only when said suspension member is at a damping position intermediate its end limits of travel.

7 Claims, 6 Drawing Figures

Patented July 25, 1972

Inventor:
Hans Menzi
By:
Lawrence E. Laubscher
Attorney

Patented July 25, 1972     3,679,013

Inventor:
Hans Mengi
By:
Lawrence E. Laubscher
Attorney

3,679,013

WEIGHING APPARATUS WITH DAMPING MEANS

This invention relates to weighing apparatus including means for suppressing pendulum oscillations of a suspension member that carries a weighing pan and that is supported by a balance beam.

Various damping means are well known in the art for damping pendulum oscillations of the weighing pan and suspension means of weighing apparatus. Most of these devices are friction devices which cooperate with the underside of the weighing pan by means of pins or similar friction elements. With each of these devices, however, it is necessary to have an opening in the bottom of the case of the weighing machine, with certain obvious disadvantages, such as the ingress of dust. In addition, in some instances it is not possible, or it is possible only with difficulty, to provide friction means which act upwardly on the weighing pan, (for example, in the case of weighing apparatus which operate in a vacuum).

Certain damping devices have been proposed which act on the suspension means rather than the weighing pan, but these suffer from certain disadvantages. For example, the U.S. Pat. No. 3,074,498 describes a cardanic weighing pan suspension with damping device, but this is very expensive to construct. A further suspension damper is described in German Pat. No. 1,246,264, wherein a braking pin secured to the suspension means acts on a spring secured to the case, but only in the arrested condition of the balance beam.

All known suspension damping means have the common feature that the damping device is operable upon lowering or lifing the operative components, the particular lowering or lifting movement always reaching its limit on contact with the friction face. It is, however, often desirable for the relative movement to be continued in the same direction beyond the defined damping position, for example when it is desired to set the weighing pan upon the bottom of the case of the weighing machine, or to place the material to be weighed on the pan.

According to a primary object of the present invention, there is provided a weighing machine including damping means for suppressing the pendulum oscillations of a suspension member that carries a weighing pan, said damping means comprising a first damping element carried on the suspension means and a second damping element associated with said first damping element and mounted on a fixed part of the weighing machine, the operative connection of said damping elements being produced by vertical relative movement without limiting the travel of the movable damping element.

The configuration of the two damping elements may be so selected that the damping operative connection is effected after a first vertical relative movement, and released again after a further vertical relative movement. The direction of the second relative movement can be the same as or opposite to the direction of the first movement. In addition it is possible for the damping device according to the invention to be brought into operative connection by lowering or lifting the movable part, depending on whether the movable part was located above or below the fixed part at the beginning of the movement.

In accordance with the invention this is achieved in that a first damping element which is fixedly mounted on the suspension means comes into operative connection with a second damping element, for example by lowering or lifting the suspension means, the operative components of said second damping element comprising, for example, a plurality (preferably from two to four) of resilient, radially symmetrically arranged friction faces that are secured by suitable means directly or indirectly to the fixed part of the weighing machine. The dimensions and the rigidity of the resilient friction faces are so selected that, regardless of the damping action, by their flexibility they permit any desired further vertical movement of the movable damping element. This further movement can be concluded both within and outside the operative zone of the damping device. This arrangement has the advantage that it is of a simple construction; however further arrangements according to the invention are possible in which, for example in the case of a suspension means which is not moved in the vertical direction, the second damping element which is carried on the fixed part of the weighing machine, is displaced vertically by suitable means. In addition a converse arrangement is also possible wherein the resilient friction faces are disposed on the suspension means.

By using electrically conductive materials, the electrostatic charges that are developed on the moving element may be transferred from the suspension means to the fixed part of the weighing machine during the damping operation, assuming that the suspension means is suspended in a non-conductive manner from the balance beam, as is the case for example, when using sapphire bearings. This can be of particular advantage in some arrangements, for example when carrying out long-duration gravimetric tests in a vacuum. The discharge could be effected by temporarily producing the operative connection of the damping device, this interrupting the weighing operation.

Other objects and advantages of the invention will become apparent from a study of the following specification when viewed in the light of the accompanying drawings in which.

Figure 1:
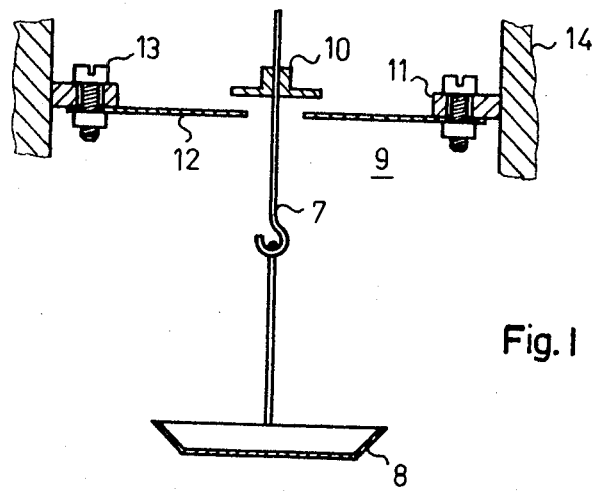
FIGS. 1 to 4 are detailed somewhat diagrammatic views of the lower part of the suspension means and damping device, illustrating the operation of the damping means during lowering of the suspension means.
Figure 2:
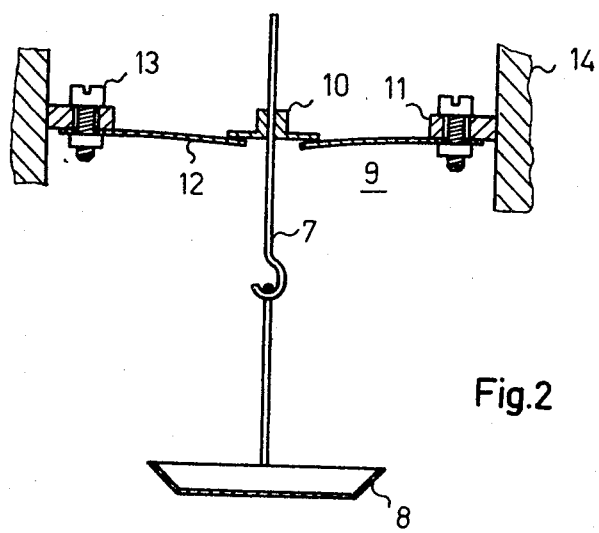

Referring to the drawings, when the suspension means 7 carrying the weighing pan 8 is lowered from the position of FIG. 1 into the position of FIG. 2, the braking plate 10 comes into operative engagement downwardly with the upper friction faces of the resilient fingers 12 of the stationary damping element 9 so that the pendulum oscillations of the suspension means are suppressed. The friction fingers 12 are radially arranged relative to the braking plate 10 and are secured, for example, by suitable means 13 to an intermediate ring 11 which in turn is secured to the fixed frame 14 of the weighing apparatus by known means which are not illustrated in detail here.

Figure 3:
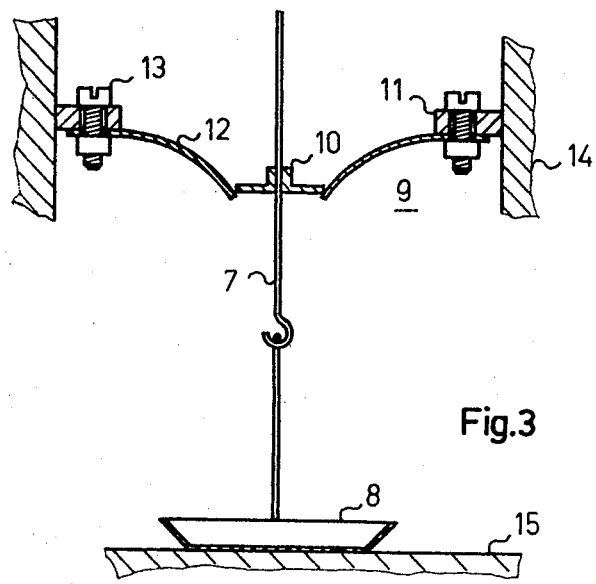
Figure 4:
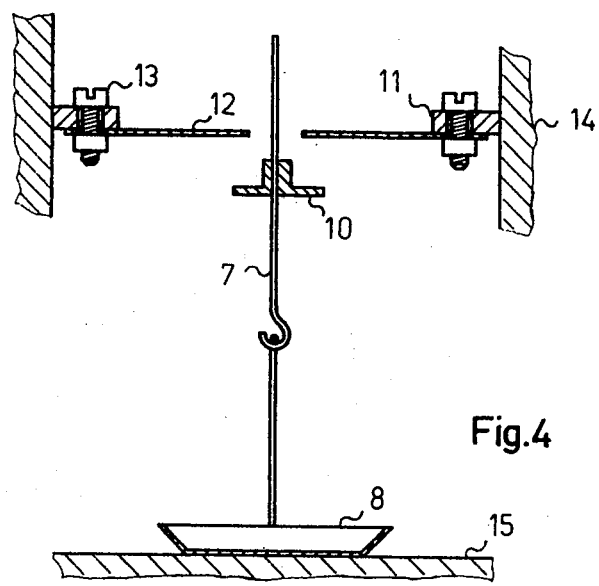

When the suspension means 7 is lowered further (FIG. 3), the friction faces 12 are flexed so as to permit the braking plate 10 to engage further into the damping means 9. In this way it is possible for example to lower the weighing pan 8 on to the bottom 15 of the case of the weighing machine. FIG. 4 shows the position where the lowering movement is continued until the movable damping element again passes out of the range of operation of the stationary damping element 9.

Figure 5:
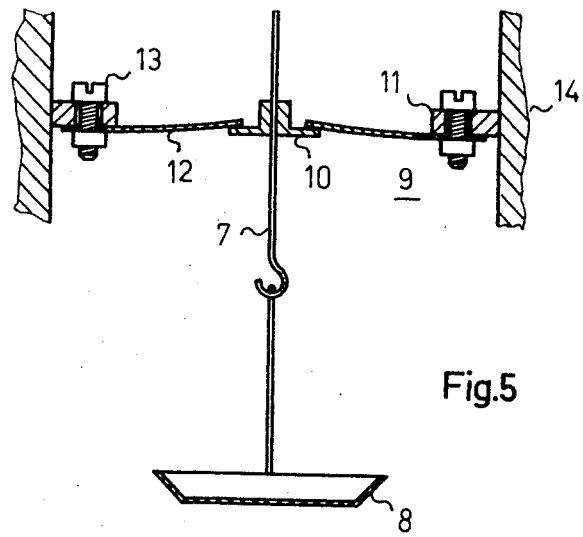
FIG. 5 shows the operation of the damping device upon raising of the suspension means.

FIG. 5 shows another embodiment in which the operative engagement is produced by lifting the suspension means 7 until the braking plate 10 comes into contact with the lower surfaces of the resilient friction faces 12.

Figure 6:
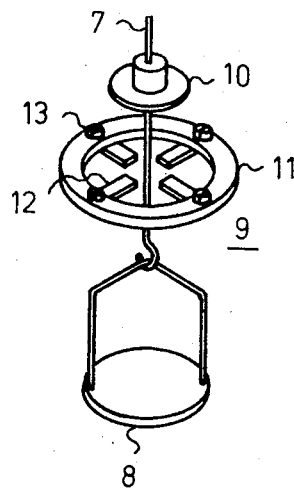
FIG. 6 shows a perspective view of the damping device.

FIG. 6 shows a perspective view of the illustrated embodiment, the fixed frame of the weighing apparatus having been omitted for clarity.

While in accordance with the provisions of the Patent Statutes I have illustrated and described the preferred forms and embodiments of the invention, it will be apparent to those skilled in the art that various changes and modifications may be made in the described apparatus without deviating from my inventive concepts.

What is claimed is:

1. Weighing apparatus of the balance beam type, comprising
   a. a frame (14);
   b. means including a vertically arranged axially reciprocable weighing pan suspension member (7) for suspending a weighing pan (8) from said balance beam, said suspension member being vertically displaceable relative to said frame between no load and load-measuring equilibrium positions; and
   c. damping means operable only during displacement of said suspension member in either direction between no-load and equilibrium positions for suppressing pendulum oscillations of said suspension member, said damping means comprising 1. a first damping element (10) connected with said suspension member; and
2. a second damping element (9) connected with said frame for engagement with said first damping element only when said reciprocatory suspension member is at a given damping position intermediate and spaced from its end limits of travel relative to said frame, said first and second damping elements being out of engagement when said suspension member and said pan are in either of said no-load and equilibrium positions.

2. Damping means for weighing apparatus including an axially reciprocable suspension member that connects a weighing pan with a balance beam which in turn is connected for movement relative to a stationary frame, comprising a. a first damping element (10) carried by said suspension member (7); and
b. second damping means (9) connected with said frame for damping engagement with said first damping element only when said reciprocatory suspension member is at a damping position intermediate its end limits of travel, said second damping means including a plurality of friction faces contained in a plane normal to, and radially extending from the axis of reciprocation of, said suspension member.

3. Apparatus as defined in claim 2, wherein said friction faces are carried by resilient members the outer ends of which are connected with said stationary frame.

4. Apparatus as defined in claim 3, wherein said first and second damping elements are each formed of a conductive material, thereby to effect conduction of electrostatic charges from one damping element to the other.

5. Apparatus as defined in claim 3, wherein said suspension member is vertically arranged for vertical reciprocatory movement relative to said frame.

6. Apparatus as defined in claim 5, wherein said first damping element engages said friction faces during downward travel of said suspension member relative to said frame.

7. Apparatus as defined in claim 5, wherein said first damping element engages said friction faces during upward travel of said suspension member relative to said frame.

* * * * *